United States Patent
Hooker et al.

(10) Patent No.: US 8,335,063 B2
(45) Date of Patent: Dec. 18, 2012

(54) REDUNDANT SYSTEMS, METHODS, AND APPARATUS FOR USE IN ARC FLASH PREVENTION SYSTEMS

(75) Inventors: John Kenneth Hooker, Louisville, KY (US); Michael Paul Lafond, Wallingford, CT (US); Henry Hall Mason, Jr., Farmington, CT (US); Megan Dalene Bardolph, Grand Rapids, MI (US)

(73) Assignee: General Electric Company, Schenectady, NY (US)

( * ) Notice: Subject to any disclaimer, the term of this patent is extended or adjusted under 35 U.S.C. 154(b) by 325 days.

(21) Appl. No.: 12/872,734

(22) Filed: Aug. 31, 2010

(65) Prior Publication Data
US 2012/0053743 A1 Mar. 1, 2012

(51) Int. Cl.
*H02H 3/16* (2006.01)
(52) U.S. Cl. ............................. 361/42; 361/44
(58) Field of Classification Search ............... 361/42–44; 700/292
See application file for complete search history.

(56) References Cited

U.S. PATENT DOCUMENTS

| | | | |
|---|---|---|---|
| 7,012,382 B2 | 3/2006 | Cheang et al. | |
| 7,259,565 B2 | 8/2007 | Diercks et al. | |
| 7,729,808 B2 * | 6/2010 | Nasle et al. | 700/286 |
| 2007/0135971 A1 | 6/2007 | Andarawis et al. | |
| 2010/0072352 A1 * | 3/2010 | Kesler et al. | 250/216 |

* cited by examiner

*Primary Examiner* — Danny Nguyen
(74) *Attorney, Agent, or Firm* — Global Patent Operation (57) ABSTRACT

A hub for use with a circuit protection system includes a first input port configured to communicatively couple to at least one sensor device, wherein the at least one sensor device includes a light source and at least one light sensor. The hub also includes a first output port configured to communicatively couple to at least one controller, and a processor communicatively coupled to the first input port and to the first output port. The processor is configured to receive a sensor status signal from the at least one light sensor via the first input port in response to a test pulse emitted by the light source, and transmit a hub status signal to the at least one controller via the first output port based at least in part on the sensor status signal.

20 Claims, 6 Drawing Sheets

REDUNDANT SYSTEMS, METHODS, AND APPARATUS FOR USE IN ARC FLASH PREVENTION SYSTEMS

BACKGROUND OF THE INVENTION

The embodiments described herein relate generally to power distribution systems and, more particularly, to arc flash detection and mitigation systems for use with power distribution systems.

Known electric power circuits and switchgear generally have conductors that are separated by insulation, such as air, or gas or solid dielectrics. However, if the conductors are positioned too closely together, or if a voltage between the conductors exceeds the insulative properties of the insulation between the conductors, an arc can occur. The insulation between the conductors can become ionized, which makes the insulation conductive and enables formation of an arc flash.

An arc flash is caused by a rapid release of energy due to a fault between two phase conductors, between a phase conductor and a neutral conductor, or between a phase conductor and a ground point. Arc flash temperatures can reach or exceed 20,000° C., which can vaporize the conductors and adjacent equipment. Moreover, an arc flash can release significant energy in the form of not only heat, but also intense light, pressure waves, and/or sound waves, sufficient to damage the conductors and adjacent equipment. However, the current level of a fault that generates an arc flash is generally less than the current level of a short circuit, such that a circuit breaker generally does not trip or exhibits a delayed trip unless the circuit breaker is specifically designed to handle an arc fault condition. Although agencies and standards exist to regulate arc flash issues by mandating the use of personal protective clothing and equipment, there is no device established by regulation that eliminates arc flash.

Standard circuit protection devices, such as fuses and circuit breakers, generally do not react quickly enough to mitigate an arc flash. One known circuit protection device that exhibits a sufficiently rapid response is an electrical "crowbar," which utilizes a mechanical and/or electro-mechanical process by intentionally creating an electrical "short circuit" to divert the electrical energy away from the arc flash point. Such an intentional short circuit fault is then cleared by tripping a fuse or a circuit breaker. However, the intentional short circuit fault created using a crowbar may allow significant levels of current to flow through adjacent electrical equipment, thereby still enabling damage to the equipment.

Light sensors may be used to detect the presence of light emitted during an arc flash. However, such sensors are often sensitive to low light levels such that they also detect non-arc-flash light and trigger a "nuisance trip" of a circuit protection device. For example, a typical arc flash event can produce light with luminous flux on the order of 100,000 lux at a distance of three to four feet from the arc flash event, while known light sensors generally saturate at 700 lux or less. Light emitted by a circuit breaker during a trip, by space lighting, or by direct sunlight may cause the light sensor to falsely detect an arc flash event. In addition, failure of a light sensor can leave equipment within a switchgear compartment vulnerable to arc flash. Accordingly, it is desirable to use multiple sensors within each compartment for redundant detection of light associated with an arc flash. In addition, it is desirable to use redundant communication hubs and/or system controllers to further reduce the possibility of an arc flash causing extensive damage to power distribution equipment due to failure of one or more components.

BRIEF DESCRIPTION OF THE INVENTION

In one aspect, a hub is provided for use with a circuit protection system. The hub includes a first input port configured to communicatively couple to at least one sensor device, wherein the at least one sensor device includes a light source and at least one light sensor. The hub also includes a first output port configured to communicatively couple to at least one controller, and a processor communicatively coupled to the first input port and to the first output port. The processor is configured to receive a sensor status signal from the at least one light sensor via the first input port in response to a test pulse emitted by the light source, and transmit a hub status signal to the at least one controller via the first output port based at least in part on the sensor status signal.

In another aspect, a redundant light sensing system includes a plurality of sensor devices each having a light source and at least one light sensor, and at least one controller configured to activate a circuit protection device. The redundant light sensing system also includes at least one hub communicatively coupled to the sensor devices and to the controller. The hub is configured to receive a sensor status signal from the light sensor of each of the sensor devices, transmit a hub status signal to the controller, wherein the hub status signal is based at least in part on the sensor status signal, receive an arc flash detection signal from one of the sensor devices, and transmit the arc flash detection signal to the controller for use in activating the circuit protection device.

In another aspect, a method includes activating a light source within each of a plurality of sensor devices, and receiving a sensor status signal from each of the plurality of sensor devices, wherein the sensor status signal is representative of whether a respective light sensor in each of the sensor devices detects a test pulse emitted by a corresponding light sensor. The method also includes determining a sensor status of each of sensor devices based on the sensor status signals, determining a hub status based at least in part of the sensor status of each of the sensor devices, and transmitting a hub status signal representative of the hub status to a redundancy hub and to at least one controller.

DETAILED DESCRIPTION OF THE INVENTION

Exemplary embodiments of systems, methods, and apparatus for use in redundant optical-sensor-based arc flash detection systems are described hereinabove. These embodiments facilitate reducing the possibility of a false positive reading within an arc flash detection system. For example, these embodiments reduce the number of failure modes that can cause a false indication that an entire arc flash detection system is working as intended. Moreover, these embodiments improve the availability of the arc flash detection system because faulty sensors, hubs, and/or controllers may be repaired and/or replaced while the system continues to monitor power distribution equipment. The embodiments described herein provide an arc flash detection system that includes a network of optical sensors that cover all potential flash points within a line-up of switchgear. These sensors communicate with hubs that perform sensor diagnostics and reduce the input/output (I/O) requirements to redundant controllers used to activate arc containment devices.

Figure 1:
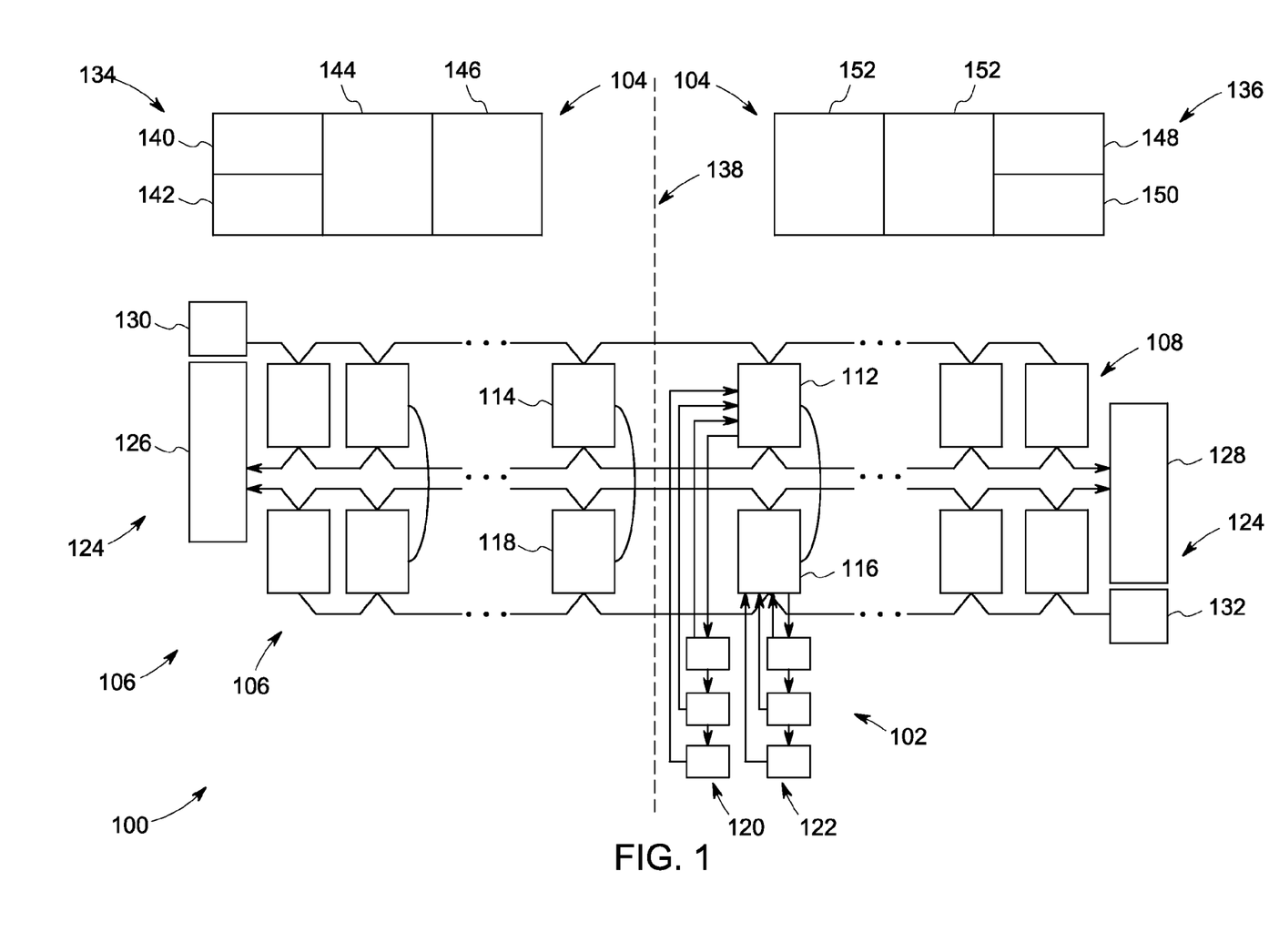
FIG. 1 is a schematic block diagram of an exemplary redundant sensing system.

FIG. 1 is a schematic block diagram of an exemplary redundant sensing system 100 as one embodiment of the invention, for use in detecting and mitigating arc flash events. In the exemplary embodiment of FIG. 1, sensing system 100 includes a plurality of light sensor devices 102, each of which is positioned within a compartment of a stack of switchgear 104. Moreover, sensing system 100 includes a plurality of hubs 106, including a first set of hubs 108 and a second set of hubs 110. For example, first set of hubs 108 includes first hub 112 and second hub 114, and second set of hubs 110 includes a third hub 116 that forms a redundant hub pair with first hub 112, and a fourth hub 118 that forms a redundant hub pair with second hub 114. Each hub 106 is positioned within a stack of switchgear 104 and is coupled to and configured for two-way communication with each light sensor device 102 positioned in the same stack 104. For example, first hub 112 is coupled to a first portion 120 of light sensor devices 102. Similarly, third hub 116 is coupled to a second portion 122 of light sensor devices 102.

In addition, sensing system 100 includes a plurality of controllers 124 including a first controller 126 and a second controller 128. Each controller 124 is coupled to each hub 106 to facilitate communication redundancy. Each controller 124 is coupled to or, alternatively includes, a power supply that supplies power, such as low-voltage DC power, to hubs 106. For example, first controller 126 includes or is coupled to a first power supply 130 that supplies power to first set of hubs 108, and second controller 128 includes or is coupled to a second power supply 132 that supplies power to second set of hubs 110.

In the exemplary embodiment of FIG. 1, sensing system 100 is coupled to power distribution equipment within stacks 104. For example, FIG. 1 illustrates two stacks of switchgear in a main-tie-main configuration, including a first stack 134 and a second stack 136, separated by a shipping split 138. First stack 134 includes first controller 126, a portion of first set of hubs 108, and a portion of second set of hubs 110. In addition, first stack 134 includes a first arc flash containment device 140, a first main circuit breaker 142, one or more first feeder circuit breakers 144, and a tie circuit breaker 146 that selectively connects first stack 134 and second stack 136. Second stack 136 includes second controller 128, a portion of first set of hubs 108, and a portion of second set of hubs 110. Moreover, second stack 136 includes a second arc flash containment device 148, a second main circuit breaker 150, and one or more second feeder circuit breakers 152.

Figure 2:
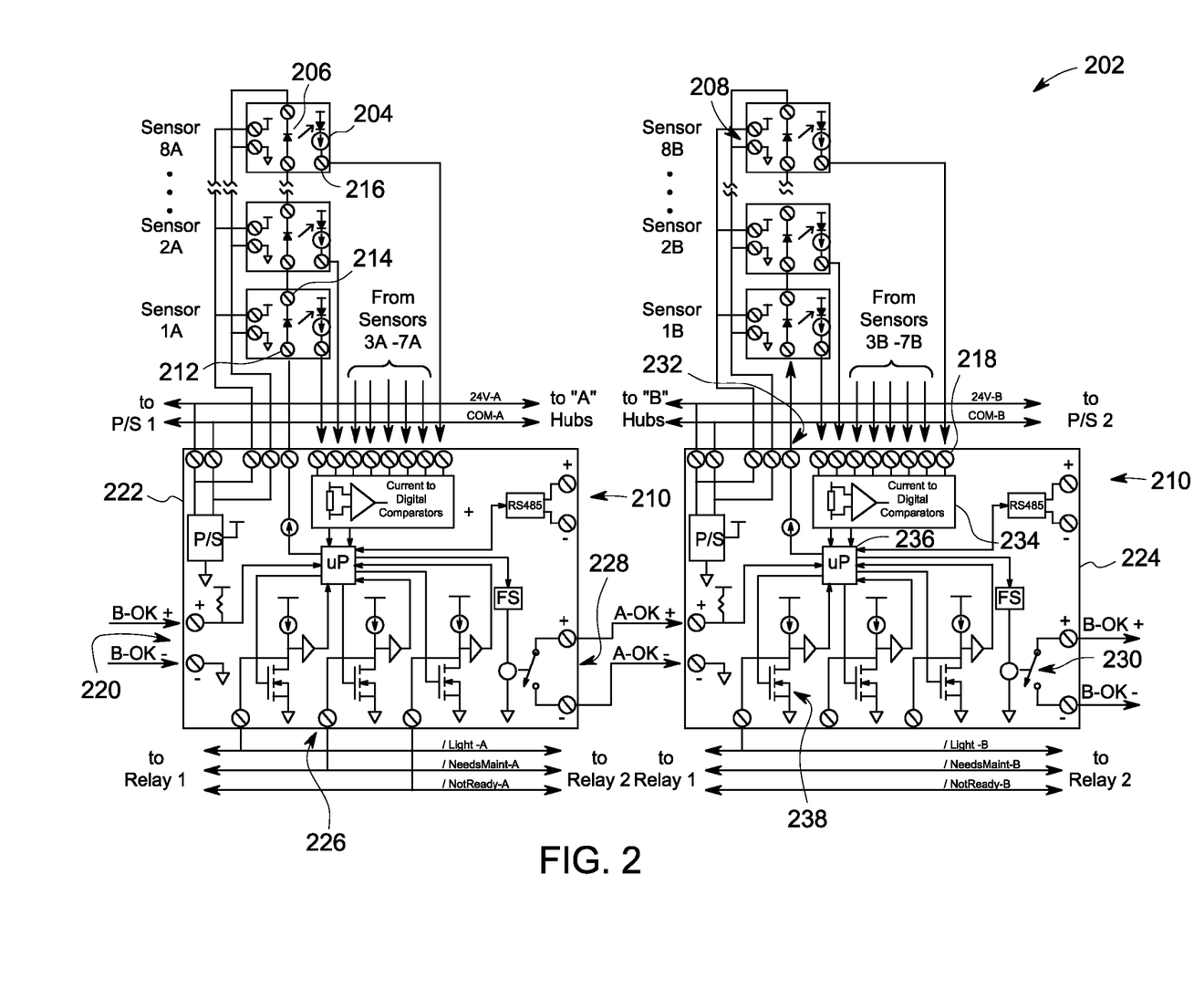
FIG. 2 is a schematic diagram of an exemplary digital redundant sensing system that is one embodiment of the sensing system shown in FIG. 1.

FIG. 2 is a schematic diagram of an exemplary digital redundant sensing system 200 that is one embodiment of sensing system 100 (shown in FIG. 1). In the exemplary embodiment of FIG. 2, each light sensor device 202 includes a light sensor 204 and a light source 206 that is positioned to cause a response by light sensor 204. In some embodiments, each light sensor device 202 includes multiple light sensors 204 to facilitate redundancy in detection of light related to an arc flash event. Light source 206 may be a light emitting diode (LED), an organic LED (OLED), a near infrared LED, or any other suitable device for emitting light or radiant energy. Light sensor 204 may be a photodetector, such as an optical detector, a photoresistor, a photodiode, a phototransister, an LED that is reverse-biased to detect light rather than to emit light, or any other suitable device for detecting light. Moreover, each light sensor device 202 includes power input ports 20 that receive power from a hub 210, a test signal input port 212, a test signal output port 214, and a sensor status output port 216. In the exemplary embodiment of FIG. 2, light sources 206 are serially connected, or "daisy chained," and are driven by a current received from hub 210. In an alternative embodiment, light sources 206 may be separately coupled to hub 210 to enable hub 210 to individually control light sources 206.

Each hub 210 includes a plurality of first input ports 218 that couple to light sensors 204 to receive a sensor status. Moreover, each hub 210 includes a second input port 220 that receives a hub status from a paired redundancy hub. For example, a first hub 222 includes second input port 220 for receiving a hub status signal from a second hub 224. Each hub 210 also includes a plurality of first output ports 226 for use in transmitting a paired hub status signal to one or more controllers (not shown in FIG. 2). In addition, each hub 210 includes a second output port 228 that transmits a hub status to a paired redundancy hub. For example, first hub 222 includes second output port 228 for transmitting a hub status signal to second input port 220 of second hub 224. Second output port 228 is coupled to a relay 230 that is open during normal operation. Moreover, each hub 210 includes a plurality of third output ports 232 that output power to light sensor device 202 and also output a test signal that activates light source 204 for use in testing light sensor device 202.

Furthermore, each hub 210 includes a plurality of current to digital comparators 234 that receive a sensor status from light sensor 204. The sensor status signal is a current having one of two levels. A lower current level is associated with a "sensor ready" status of light sensor 204, and an upper current level is associated with a "light detected" status of light sensor 204. Moreover, if comparators 234 detect a non-functioning light sensor 204 comparators 234 do not receive any sensor status signal.

Each hub 210 also includes a processor 236 that determines the hub status and transmits the hub status to the paired hub. Processor 236 also determines the paired hub status and transmits a paired hub status signal to one or more controllers. The paired hub status signal represents a status of the paired of redundant hubs 210 and is based on a hub status of each hub 210. The hub status of each hub 210 is based on the sensor status of each light sensor device 202 coupled to hub 210, and results of internal tests performed by hub 210. For example, when first hub 222 detects no errors during its internal self-tests and detects no errors or sensor failures in light sensor devices 202, processor 236 causes a relay coil of relay 230 to close, which results in a positive hub status signal to be sent to second hub 224. If processor 236 detects an error or loss of power, processor 236 causes the relay coil of relay 230 to remain open, which is detected by second hub 224. Second hub 224 then transmits a paired hub status signal to the controllers via one of first output ports 226, wherein the paired hub status signal indicates a need for maintenance on first hub 222. However, if both first hub 222 and second hub 224 detect an error or loss of power, both first and second hubs 222 and 224 transmit a paired hub status signal to the controllers via one of first output ports 226. Each hub 210 is configured to transmit one of three signals to the controllers, including a first status signal that indicates to the controllers that no errors or loss of power have been detected, a second status signal that indicates that an error or loss of power was detected within a paired hub, and a third status signal that indicates that an error or loss of power has been detected in both hubs. Each possible signal is associated with a corresponding first output port 226. Processor 236 determines the signal to send to the controllers, and activates a field-effect transistor (FET) 238, which pulls an associated line to a low level.

Figure 3:
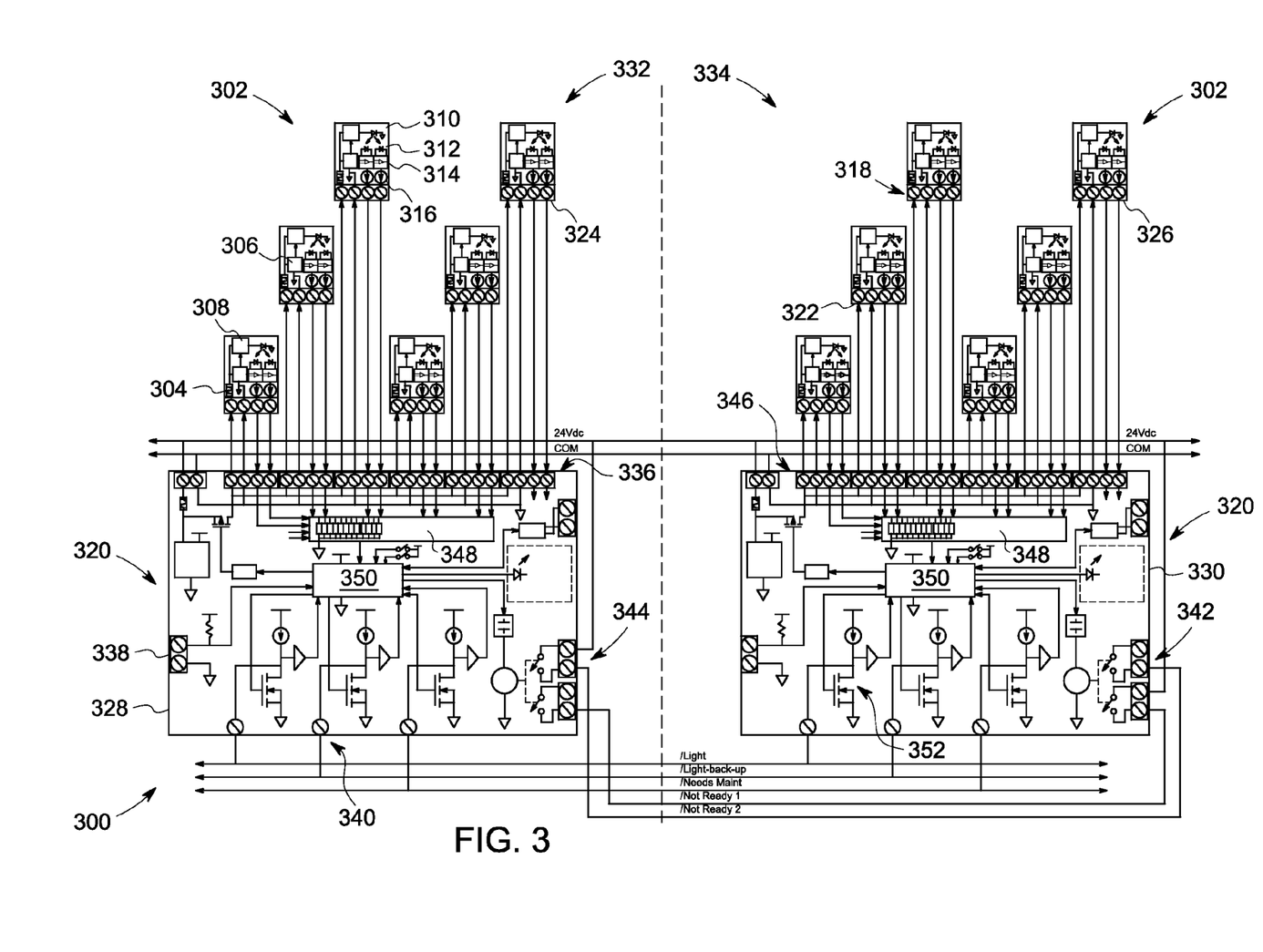
FIG. 3 is a schematic diagram of one embodiment of an analog redundant sensing system that is another embodiment of the sensing system shown in FIG. 1.

FIG. 3 is a schematic diagram of one embodiment of an analog redundant sensing system 300, for use in detecting and mitigating arc flash events. In the exemplary embodiment of FIG. 3, sensing system 300 includes a plurality of light sensor devices 302 that each includes a fuse 304, a linear regulator 306, a timer 308, a light source 310, and redundant light sensors 312. Moreover, each light sensor device 302 includes an op-amp 314 that is coupled to a corresponding light sensor 312 and a voltage-to-current converter 316 that is coupled to a corresponding op-amp 314. In addition, each light sensor device 302 includes a first input port 318 that receives power from a hub 320, and a second input port 322 that receives a sensor test command from hub 320. Each light sensor device 302 also includes a first output port 324 and a second output port 326 that each transmit a sensor status signal to hub 320. Specifically, first output port 324 transmits a first sensor status signal associated with a first light sensor and second output port 326 transmits a second sensor status signal associated with a second light sensor.

Moreover, in the exemplary embodiment of FIG. 3, sensing system 300 includes a plurality of hubs 320, including a first hub 328 and a second hub 330. Furthermore, each hub 320 is positioned within separate switchgear stacks. For example, first hub 328 is positioned to detect and mitigate arc flash events in a first stack 332, and second hub 330 is positioned to detect and mitigate arc flash events in a second stack 334. Each hub 320 includes a plurality of first input ports 336 that couple to light sensors 312 to receive a sensor status. More specifically, each hub 320 includes a respective first input port 336 for each of first output port 324 and second output port 326 of light sensor device 302. Moreover, each hub 320 includes a second input port 338 that receives a hub status from a paired redundancy hub. For example, first hub 328 includes second input port 338 for receiving a hub status signal from second 330. Each hub 320 also includes a plurality of first output ports 340 for use in transmitting a paired hub status signal to one or more controllers (not shown in FIG. 3). In addition, each hub 320 includes a second output port 342 that transmits a hub status to a paired redundancy hub. For example, first hub 328 includes second output port 342 for transmitting a hub status signal to second input port 338 of second hub 330. Second output port 342 is coupled to two relays 344 that are open during normal operation, but when closed indicate a normal operation status. Moreover, each hub 320 includes a plurality of third output ports 346 that output power to light sensor device 302 and also output a test signal that activates light source 310 for use in testing light sensor device 302.

Furthermore, each hub 320 includes a plurality of resistors 348 that receive a sensor status signal from light sensor 312. The sensor status signal is a current having one of two levels. A lower current level is associated with a "sensor ready" status of light sensor 312, and an upper current level is associated with a "light detected" status of light sensor 312. Moreover, resistors 348 detect a non-functioning light sensor 312 if resistors 348 do not receive any sensor status signal. Resistors 348 convert the sensor status signal into a voltage representative of the sensor status. For example, a lower voltage level is generated by the lower current level and is associated with the "sensor ready" status of light sensor 312, and an upper voltage level is generated by the upper current level and is associated with the "light detected" status of light sensor 312.

Each hub 320 also includes a processor 350 that determines the hub status and transmits the hub status to the paired hub. Processor 350 also determines the paired hub status and transmits a paired hub status signal to the controllers. The paired hub status signal represents a status of the paired of redundant hubs 320 and is based on a hub status of each hub 320. The hub status of each hub 320 is based on the sensor status of each light sensor device 302 coupled to hub 320, and results of internal tests performed by hub 320. For example, when first hub 328 detects no errors during its internal self-tests and detects no errors or sensor failures in light sensor devices 302, processor 350 causes a respective relay coil of each relay 344 to close, which results in a positive hub status signal to be sent to second hub 330. If processor 350 detects an error or loss of power, processor 350 causes the respective relay coil of each relay 344 to remain open, which is detected by second hub 330. Second hub 330 then transmits a paired hub status signal to the controllers via one of first output ports 340, wherein the paired hub status signal indicates a need for maintenance on first hub 328. However, if both first hub 328 and second hub 330 detect an error or loss of power, both first and second hubs 328 and 330 transmit a paired hub status signal to the controllers via one of first output ports 340. Each hub 320 is configured to transmit one of three signals to the controllers, including a first status signal that indicates to the controllers that no errors or loss of power have been detected, a second status signal that indicates that an error or loss of power was detected within a paired hub, and a third status signal that indicates that an error or loss of power has been detected in both hubs. Each possible signal is associated with a corresponding first output port 340. Processor 350 determines the signal to send to the controllers, and activates a field-effect transistor (FET) 352, which pulls an associated line to a low level. In the exemplary embodiment of FIG. 3, processor 350 includes a plurality of analog-to-digital (A/D) converters (not shown).

Figure 4:
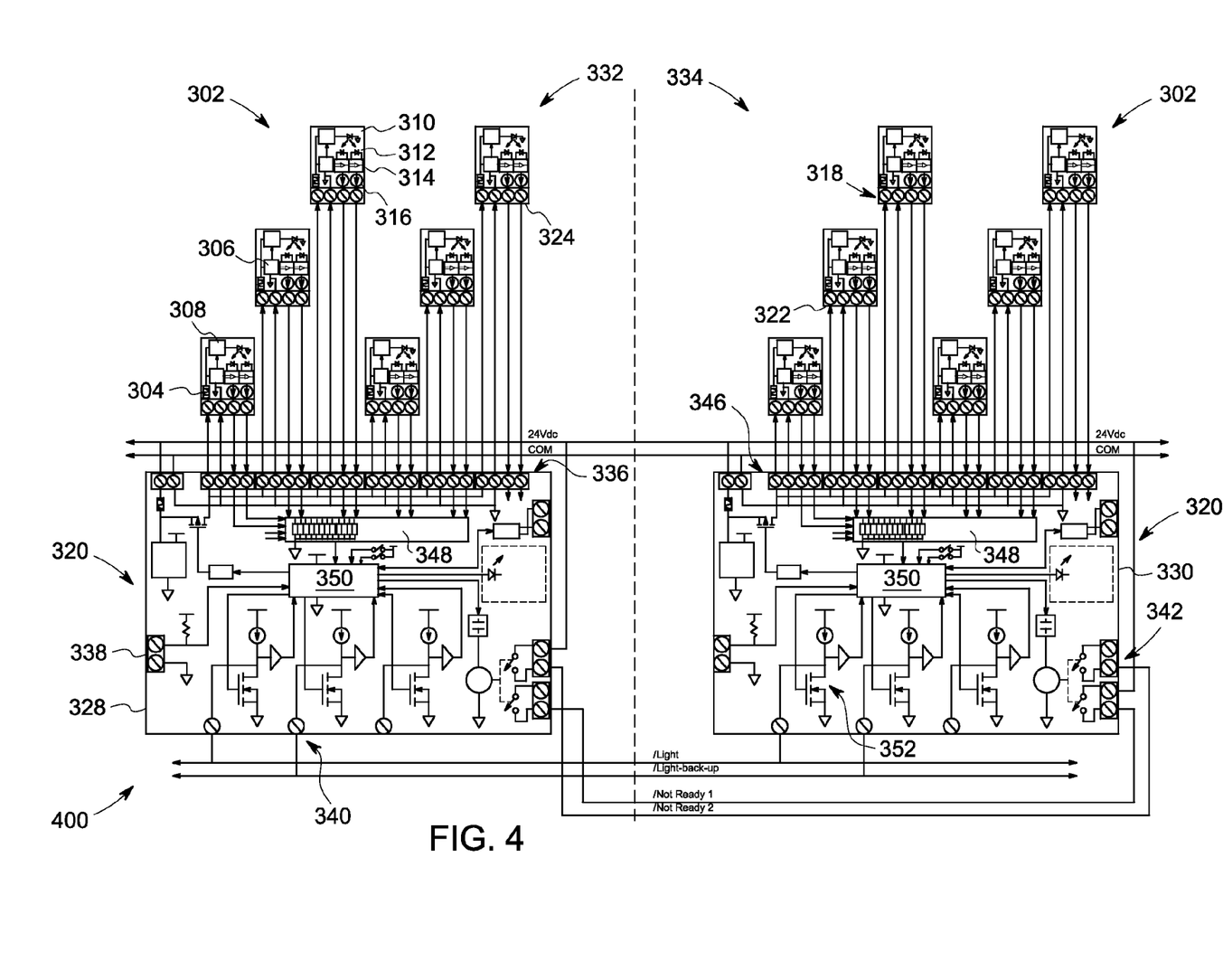
FIG. 4 is a schematic diagram of an alternative embodiment of the analog redundant sensing system shown in FIG. 3.

FIG. 4 is a schematic diagram of an alternative analog redundant sensing system 400, for use in detecting and mitigating arc flash events. The embodiment of FIG. 4 is similar to the embodiment of FIG. 3, in that sensing system 300 includes a plurality of light sensor devices 302 and a plurality of hubs 320. Moreover, each hub 320 is positioned within separate switchgear stacks. For example, first hub 328 is positioned to detect and mitigate arc flash events in a first stack 332, and second hub 330 is positioned to detect and mitigate arc flash events in a second stack 334.

However, sensing system 400 does not include a redundant connection between light sensor devices 302 and hubs 320. Moreover, each hub 320 is configured to transmit one of two signals to one or more controllers (not shown in FIG. 4), including a first status signal that indicates to the controllers that no errors or loss of power have been detected, and a second status signal that indicates that an error or loss of power was detected within a paired hub.

Figure 5:
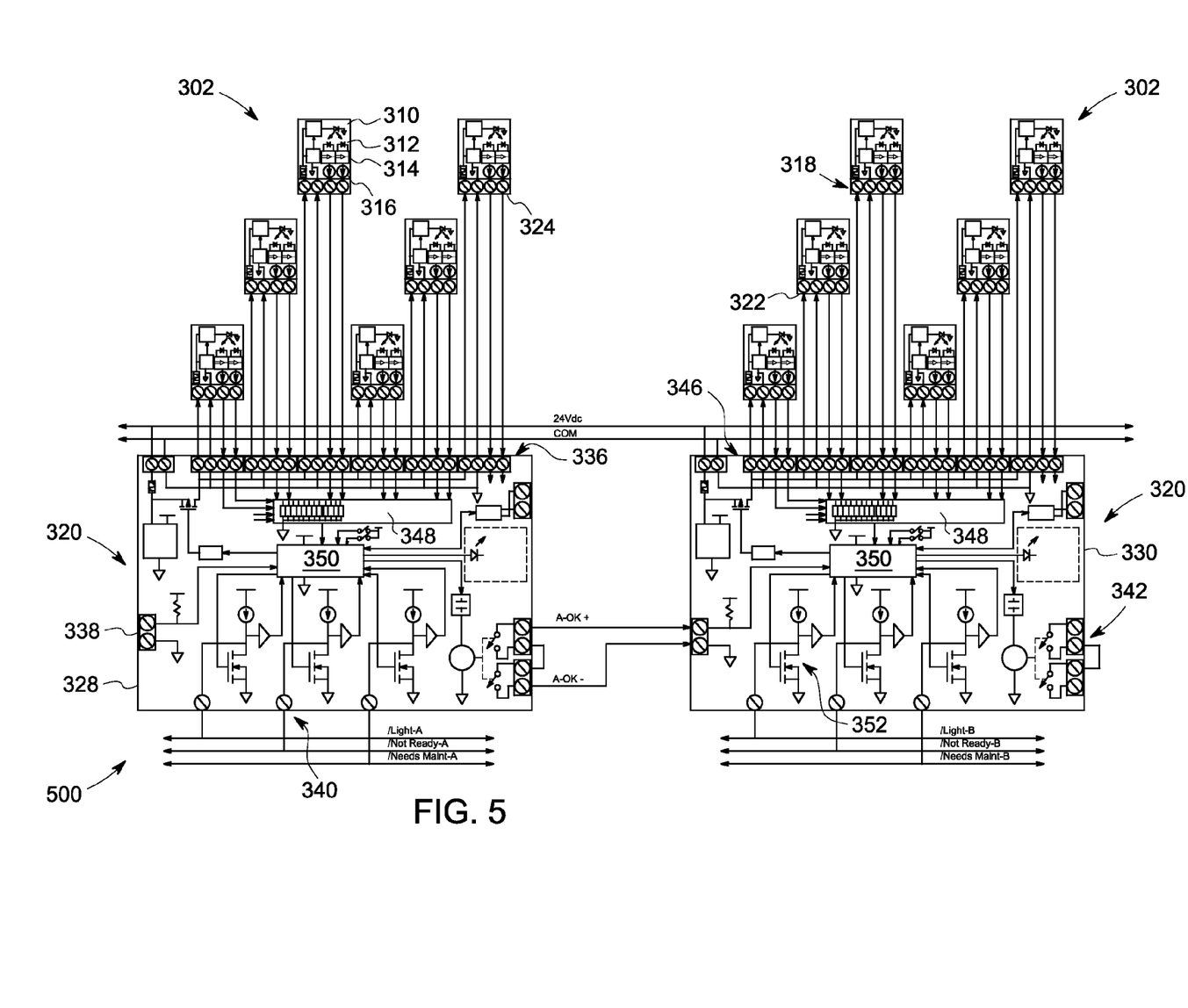
FIG. 5 is a schematic diagram of another alternative embodiment of the analog redundant sensing system shown in FIG. 3.

FIG. 5 is a schematic diagram of another alternative analog redundant sensing system 500, for use in detecting and mitigating arc flash events. The embodiment of FIG. 5 is similar to the embodiment of FIG. 4, in that sensing system 500 includes a plurality of light sensor devices 302 and a plurality of hubs 320. However, each switchgear stack includes both first hub 328 and second hub 330 and light sensor devices 302 coupled to each. Accordingly, sensing system 500 enables a fully redundant approach to detecting and mitigating arc flash events.

Figure 6:
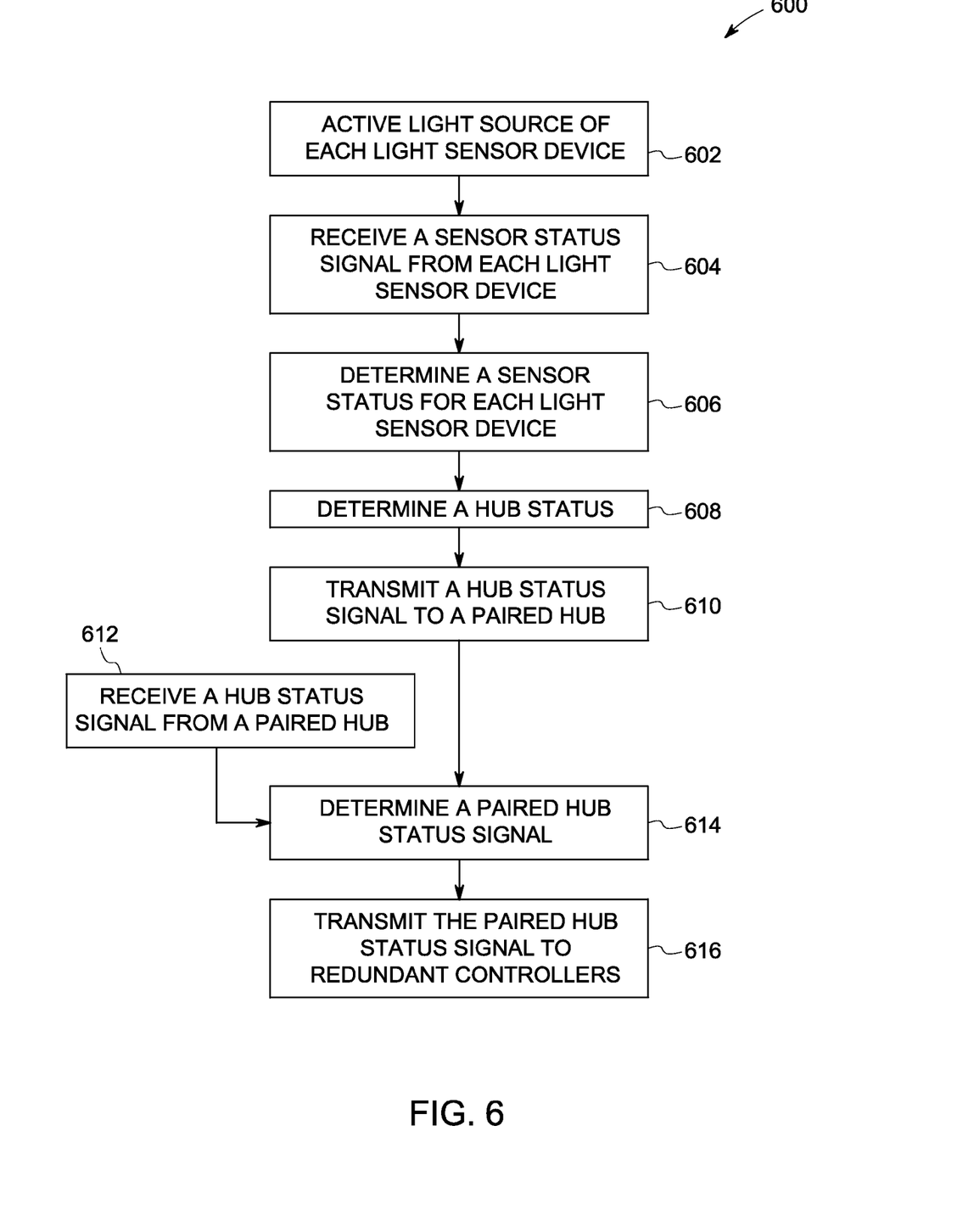
FIG. 6 is a flowchart that illustrates an exemplary method for performing a self-test of the redundant sensing system shown in FIG. 1.

FIG. 6 is a flowchart 600 illustrating an exemplary method for performing a self-test of a redundant sensing system, such as any of the redundant sensing systems shown in FIGS. 1-5. For simplicity, the operations described herein will refer to digital redundant sensing system 200 (shown in FIG. 2) except to distinguish between digital and analog functionality, at which time the operations described herein will refer instead to, or in addition to, analog redundant sensing system 300 (shown in FIG. 3).

In the exemplary embodiment of FIG. 6, each hub 210 activates 602 a light source 206 within each light sensor device 202. For example, each hub 210 transmits an activation signal to each light source 206 via third output port 232. In response to the activation signal, each light source 206 emits light toward a corresponding light sensor 204. Light sensor 204 detects the light and transmits a sensor status signal to hub 210 at a specified current level. For example, a lower current level is associated with a "sensor ready" status of light sensor 204, and an upper current level is associated with a "light detected" status of light sensor 204. Moreover, a non-functioning light sensor 204 does not transmit any sensor status signal, which is detected by hub 210. Each hub 210 receives 604 the sensor status signal from light sensors 204 and determines 606 the sensor status of each light sensor device 202. In the digital embodiment of FIG. 2, each hub 210 includes current to digital comparators 234 that receive the sensor status signal from light sensor 204 and determines the sensor status according to the current level. In the analog embodiment of FIGS. 3-5, each hub 320 includes resistors 348 that convert the sensor status signal to a voltage, which is then converted into a digital value by a plurality of analog-to-digital (A/D) converters for use by processor 350 in determining the sensor status of each light sensor device 302.

Moreover, in the exemplary embodiment of FIG. 6, each hub 210 determines 608 a hub status based on the sensor status of each light sensor device 202 and based on results of one or more internal tests. Processor 236 in each hub 210 determines the hub status and transmits 610 the hub status to the paired hub. Processor 236 also receives 612 a hub status signal from the paired hub and determines 614 the paired hub status. Processor 236 then transmits 616 a paired hub status signal to one or more controllers 124 (shown in FIG. 1). The paired hub status signal represents a status of the paired of redundant hubs 210 and is based on a hub status of each hub 210. The hub status of each hub 210 is based on the sensor status of each light sensor device 202 coupled to hub 210, and results of internal tests performed by hub 210.

Exemplary embodiments of systems, methods, and apparatus for use in a redundant sensor and hub scheme for an arc flash prevention and mitigation system are described above in detail. The systems, methods, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A controller, such as those described herein, includes at least one processor or processing unit and a system memory. The controller typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary power distribution system environment, embodiments of the invention are operational with numerous other general purpose or special purpose power distribution system environments or configurations. The power distribution system environment is not intended to suggest any limitation as to the scope of use or functionality of any aspect of the invention. Moreover, the power distribution system environment should not be interpreted as having any dependency or requirement relating to any one or combination of components illustrated in the exemplary operating environment. Examples of well known power distribution systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term processor.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hub for use with a circuit protection system, said hub comprising:
   a first input port configured to communicatively couple to at least one sensor device, wherein the at least one sensor device includes a light source and at least one light sensor;
   a first output port configured to communicatively couple to at least one controller; and
   a processor communicatively coupled to said first input port and to said first output port, said processor configured to:
      receive a sensor status signal from the at least one light sensor via said first input port in response to a test pulse emitted by the light source; and
      transmit a hub status signal to the at least one controller via said first output port based at least in part on the sensor status signal.

2. A hub in accordance with claim 1, wherein the at least one sensor device includes a plurality of sensor devices, and wherein said first input port comprises a plurality of first input ports each configured to communicatively couple to a respective sensor device of the plurality of sensor devices.

3. A hub in accordance with claim 2, wherein said processor is further configured to:
   activate a respective light source of each of the plurality of sensor devices to test a corresponding light sensor; and
   receive a sensor status signal from each of the plurality of sensor devices.

4. A hub in accordance with claim 2, wherein said processor is further configured to receive a current representative of the sensor status signal from each of the plurality of sensor devices and to determine a sensor status for each of the plurality of sensor devices based on the current.

5. A hub in accordance with claim 4, wherein said processor is further configured to determine the hub status based at least in part on the sensor status of each of the plurality of sensor devices.

6. A hub in accordance with claim 1, wherein said processor is further configured to determine a hub status of said hub based at least in part on the sensor status signal and an operation status of said hub, and wherein the hub status signal is representative of the hub status.

7. A hub in accordance with claim 1, wherein said hub further comprises a second output port configured to communicatively couple to a paired redundant hub, and wherein said processor is further configured to transmit the hub status to the paired redundant hub via said second output port.

8. A hub in accordance with claim 1, wherein said hub further comprises a second input port configured to communicatively couple to a paired redundant hub, and wherein said processor further configured to receive a hub status of the paired redundant hub via said second input port.

9. A redundant light sensing system comprising:
   a plurality of sensor devices each comprising a light source and at least one light sensor;
   at least one controller configured to activate a circuit protection device; and
   at least one hub communicatively coupled to said plurality of sensor devices and to said at least one controller, said at least one hub configured to:
      receive a sensor status signal from said at least one light sensor of each of said plurality of sensor devices;
      transmit a hub status signal to said at least one controller, wherein the hub status signal is based at least in part on the sensor status signal;
      receive an arc flash detection signal from one of said plurality of sensor devices; and
      transmit the arc flash detection signal to said at least one controller for use in activating the circuit protection device.

10. A redundant light sensing system in accordance with claim 9, wherein said at least one hub comprises a first hub and a second hub, said first hub communicatively coupled to a first plurality of sensor devices and said second hub communicatively coupled to a second plurality of sensor devices.

11. A redundant light sensing system in accordance with claim 10, wherein said first hub is configured to:
    receive a sensor status signal from said at least one light sensor of each of said first plurality of sensor devices; and
    transmit a first hub status signal to said at least one controller and to said second hub, wherein the first hub status signal is based at least in part on the sensor status signal.

12. A redundant light sensing system in accordance with claim 10, wherein said second hub is configured to:
    receive a sensor status signal from said at least one light sensor of each of said second plurality of sensor devices; and
    transmit a second hub status signal to said at least one controller and to said first hub, wherein the second hub status signal is based at least in part on the sensor status signal.

13. A redundant light sensing system in accordance with claim 9, wherein said at least one hub is further configured to determine a hub status of said at least one hub, and wherein the hub status signal is representative of the hub status and is based at least in part on the sensor status signal and an operation status of said at least one hub.

14. A redundant light sensing system in accordance with claim 9, wherein said at least one controller comprises a first controller and a second controller, each of said first controller and said second controller communicatively coupled to said at least one hub and to the circuit protection device, each of said first controller and said second controller configured to receive the hub status signal and the arc detection signal from said at least one hub and to activate the circuit protection device based on the arc detection signal.

15. A method comprising:
    activating a light source within each of a plurality of sensor devices;
    receiving a sensor status signal from each of the plurality of sensor devices, wherein the sensor status signal is representative of whether a respective light sensor in each of the plurality of sensor devices detects a test pulse emitted by a corresponding light sensor;
    determining a sensor status of each of the plurality of sensor devices based one the sensor status signals;
    determining a hub status based at least in part on the sensor status of each of the plurality of sensor devices; and
    transmitting a hub status signal representative of the hub status to a redundancy hub and to at least one controller.

16. A method in accordance with claim 15, wherein activating a light source within each of a plurality of sensor devices comprises:

using a first hub to activate a light source of each of a first plurality of sensor devices to test a corresponding light sensor;

receiving, by the first hub, a sensor status signal from each of the first plurality of sensor devices;

using a second hub to activate a light source of each of a second plurality of sensor devices to test a corresponding light sensor; and receiving, by the second hub, a sensor status signal from each of the second plurality of sensor devices.

17. A method in accordance with claim 15, wherein determining a sensor status comprises receiving a current representative of the sensor status signal from each of the plurality of sensor devices and determining a sensor status for each of the plurality of sensor devices based on the current.

18. A method in accordance with claim 15, wherein determining a hub status comprises determining the hub status based on the sensor status signal of each of the plurality of sensor devices and an operation status of the hub.

19. A method in accordance with claim 15, further comprising receiving an arc flash detection signal from one of the plurality of sensor devices.

20. A method in accordance with claim 19, further comprising transmitting the arc flash detection signal to the at least one controller for use in activating a circuit protection device.

* * * * *